Figure 1:
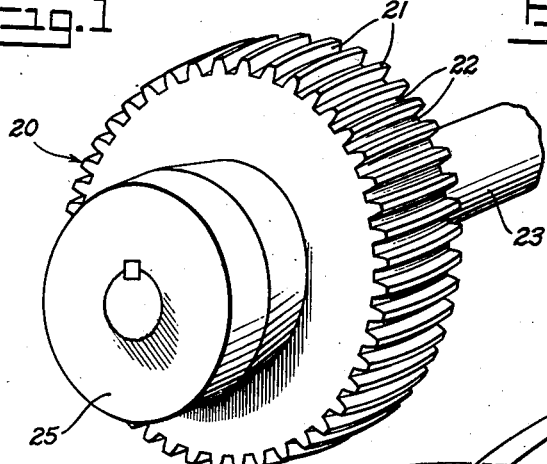

Dec. 1, 1942.  J. W. BARCUS  2,303,813
GEAR COUPLING
Filed May 16, 1940  4 Sheets-Sheet 1

INVENTOR.
John W. Barcus
BY David F. Soody
ATTORNEY.

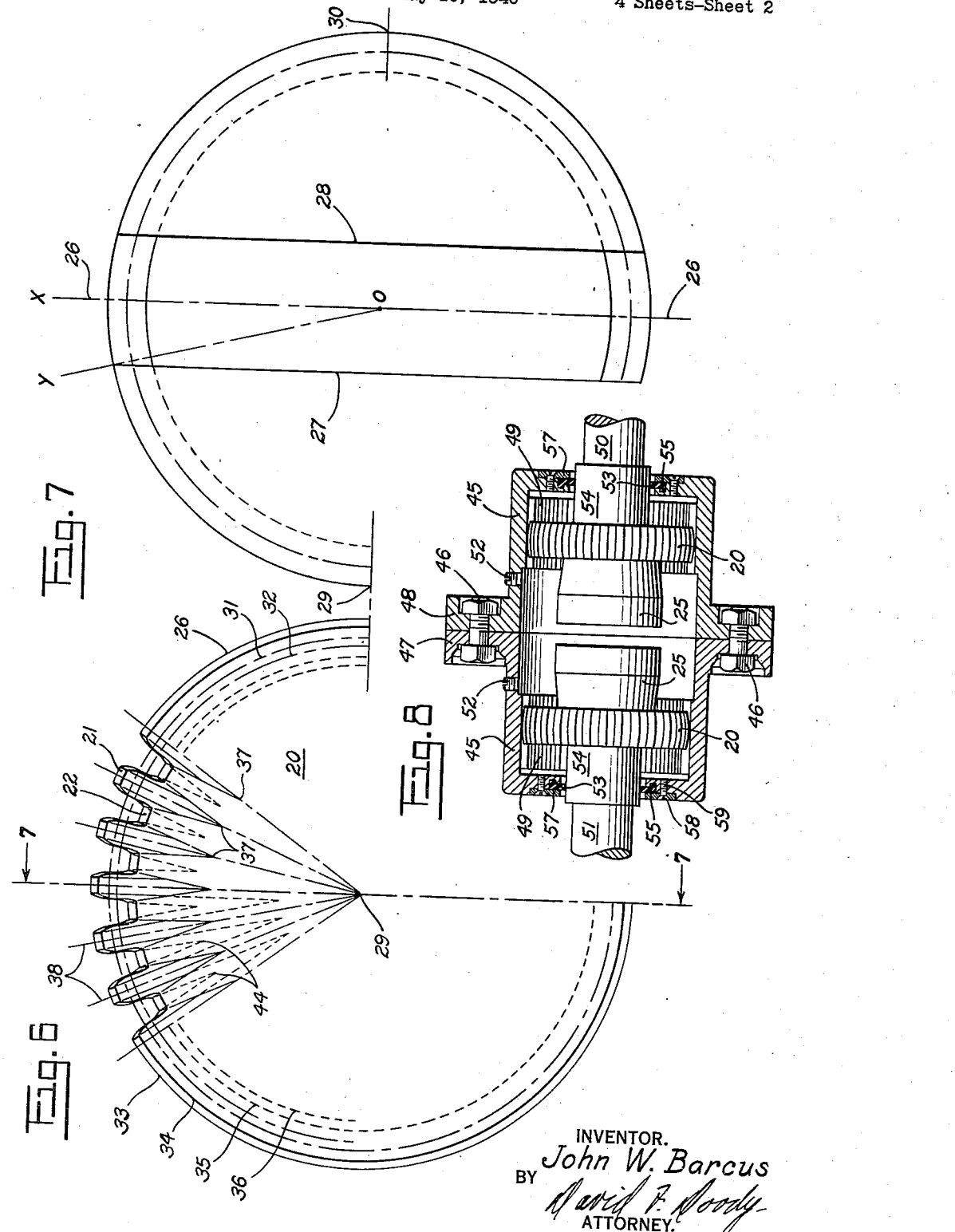

Dec. 1, 1942.　　　　J. W. BARCUS　　　　2,303,813
GEAR COUPLING
Filed May 16, 1940　　　　4 Sheets-Sheet 3
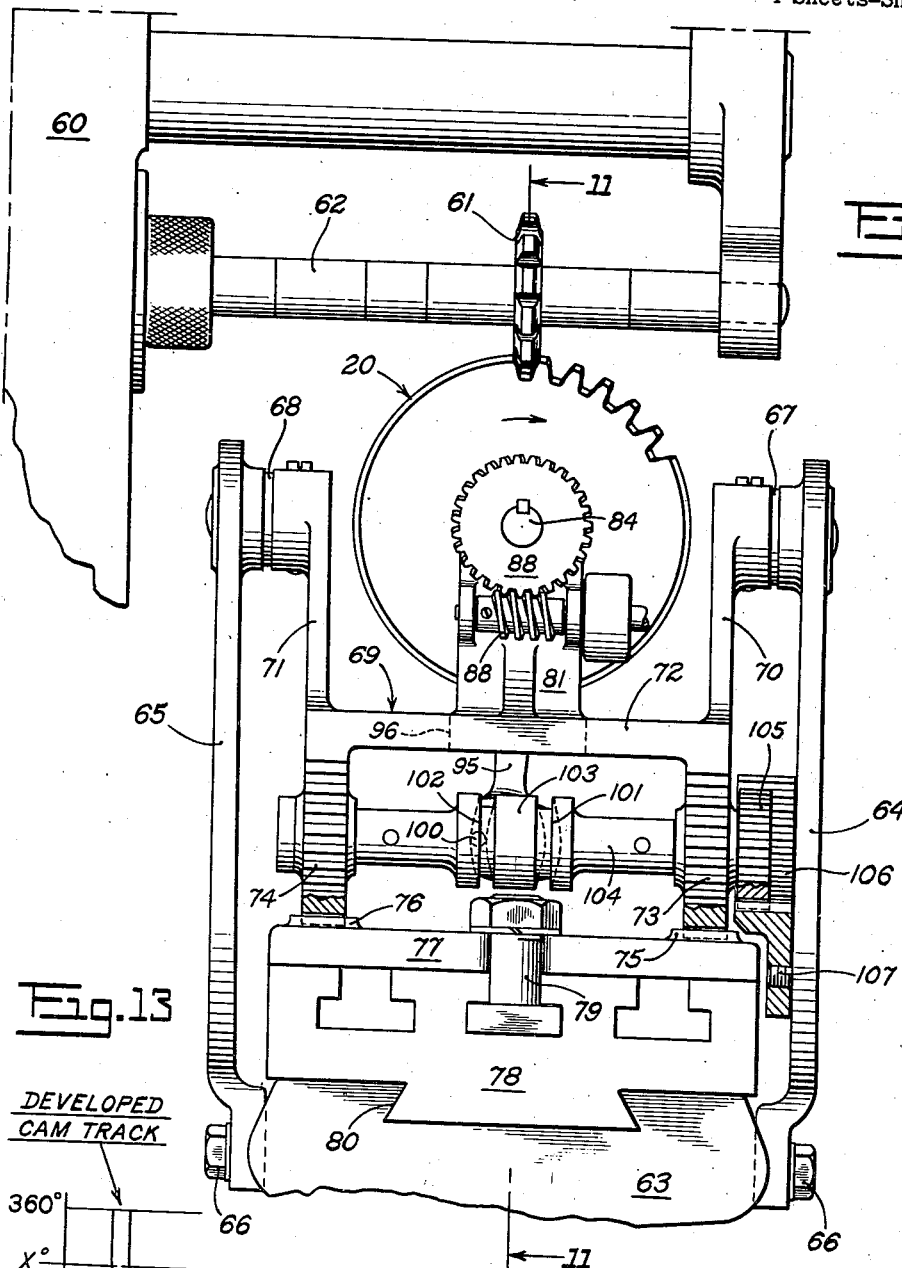
Fig. 9
Fig. 13
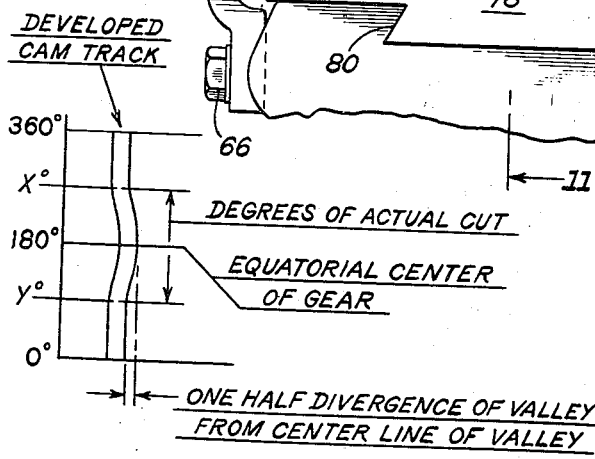
INVENTOR.
John W. Barcus
BY David F. Soody
ATTORNEY.

Dec. 1, 1942. J. W. BARCUS 2,303,813
GEAR COUPLING
Filed May 16, 1940 4 Sheets-Sheet 4
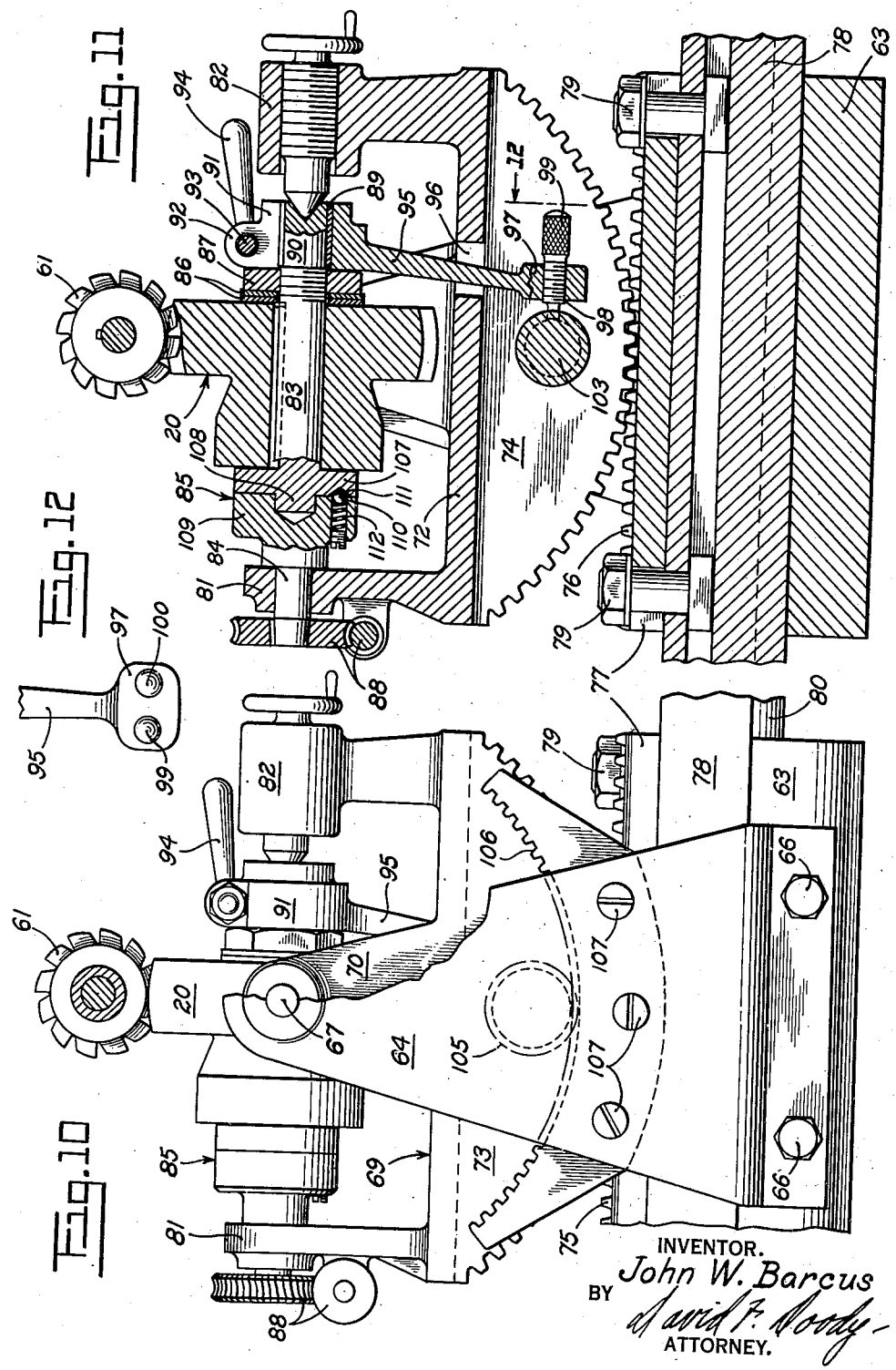
INVENTOR.
John W. Barcus
BY
ATTORNEY.

Patented Dec. 1, 1942

2,303,813

UNITED STATES PATENT OFFICE 2,303,813

GEAR COUPLING

John W. Barcus, Baltimore, Md., assignor of one-third to John O. Mitchell, and one-third to Harry L. Price, both of Baltimore, Md.

Application May 16, 1940, Serial No. 335,444

2 Claims. (Cl. 64—19)

This invention relates to gears and more particularly to spherical gears.

Spherical gears in general are old in the art, but until the present invention no spherical gear has been available to satisfy the peculiar requirements of uniform meshing between two shafts, the axes of which are angled or out of alignment.

One of the objects of the present invention resides in the method of making a new spherical gear.

Another object lies in the provision of a novel machine for the manufacture of a novel type of spherical gear.

A further object is a novel spherical gear capable of meshing with conventional gears in a unique manner.

Another object of the present invention is the provision of a novel coupling unit of industrial machines that will effect the transmission of power without loss and for different conditions of misalignment between driving and driven shafts.

Figure 2:
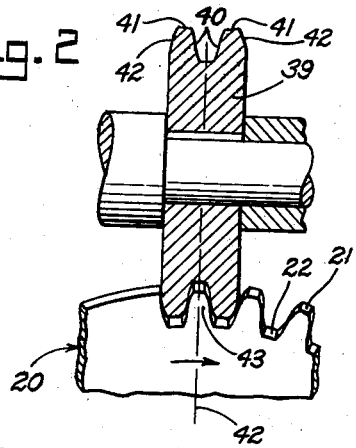
Figure 5:
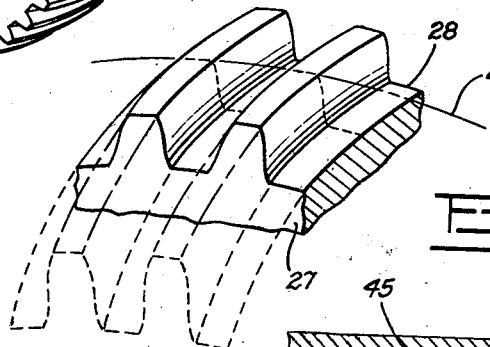
Figure 4:
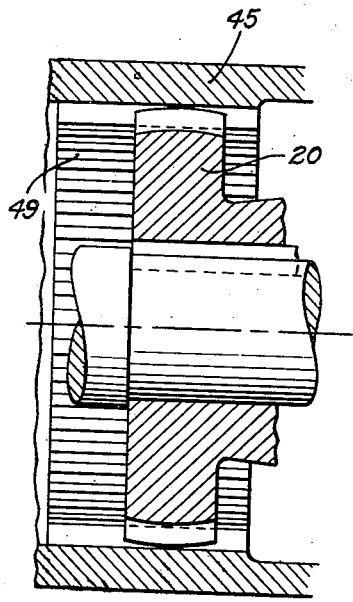
Figure 3:
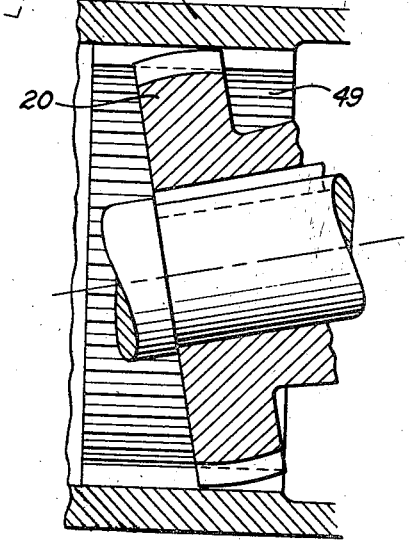

Other objects will become apparent from a study of the following specification, together with the attached drawings, throughout the several figures of which, like parts are designated by like reference characters:

Fig. 1 is a representation in perspective of the novel gear of the present invention, Fig. 2 is a view of a portion of the gear of Fig. 1 in elevation with one form of cutter shown in cross section, Fig. 3 is a detail in perspective of two teeth of the novel gear of the present invention, Fig. 4 is a longitudinal sectional view of the novel spherical gear meshing with an internal spur gear, Fig. 5 is a similar view showing, however, the spherical gear to be meshing in a condition of misalignment with the axis of the spur gear, Fig. 6 is a diagrammatic view showing lines of construction of the novel form of teeth used in the new spherical gear, Fig. 7 is a similar view, but drawn in the plane of the great circle at right angles to the axis of rotation of the gear, Fig. 8 is a view partly in elevation and partly in section, of a novel coupling of the present invention, Fig. 9 is a front elevational view, partly in section, showing a novel machine for cutting a gear of the present invention, Fig. 10 is a side elevational view of the machine with a part broken away, Fig. 11 is a longitudinal sectional view taken along the line 11—11 of Fig. 9, Fig. 12 is a front elevational view of a detail of the machine, taken along the line 12—12 of Fig. 11, and Fig. 13 is a diagrammatic representation of a cam which is an essential part of the novel machine.

In accordance with the present invention, a novel spherical gear is provided having involute teeth of unique construction, particularly designed to mesh with conventional spur gears and form a new coupling of driving and driven shafts which permits of misalignment of the shafts without loss of power and without the backlash or binding common to couplings of the type available prior to this invention. The spherical gear itself, apart from the coupling, has valuable application to the field of power transmission, and a novel method of making the gear, as well as a novel machine for its manufacture are also a part of the present invention. While only particular descriptions and figures of the present invention are here shown, it will be understood that various changes may be made without exceeding the scope of the invention as defined by the appended claims.

Having reference particularly to Fig. 1, there is shown a spherical gear 20 having involute teeth 21 of a form to be later described, and valleys 22 between teeth 21. Gear 20 is provided with a shaft 23 to which it may be keyed in the usual fashion, and about which it is intended to be rotated. Gear 20 may be provided with an enlarged hub portion 25, as will be described below. The line 26 of Fig. 3, shown also in Figs. 6 and 7, designates the equatorial plane of the spherical gear, while the flank or end faces are designated by 27 and 29. Figs. 6 and 7 are diagrammatic of the construction of the teeth 21 of gear 20. As will readily be seen, the flank faces 27 and 28 are parallel to the plane of the equator, so that geometrically the gear 20 is taken from the equatorial zone of a sphere.

Point 29 of Fig. 6 and points 29 and 30 of Fig. 7, represent poles of the sphere from which gear 20 is constructed, while circular line 31 represents the pitch line on the equator, with line 32 indicating the pitch line at one of the end faces 27 or 28. Lines 31 and 32 are drawn with the same radius and appear spaced only because Fig. 6 represents the gear development diagrammatically from the equatorial plane out to the plane of one of the poles. Other lines of construction are indicted by 33 and 34, the addendum in the equatorial plane and on a flank face, respectively, and 35 and 36, the dedendum in the equatorial plane and on a flank face, respectively. The full lines converging at points 37 represent the construction lines of the edges of valleys 22. Actually the edges are not cut to points 37, as the outer edges of the valleys in the gear itself fall within the plane passing through circular line 36, but carrying the lines to convergence at points 37 indicates clearly that from the equator to each flank face, the valleys 22 diverge. The amount of divergence is so slight as to be hardly perceptible to the eye unless thus illustrated, yet this divergence is an important element of the present invention.

A novel feature of the teeth 21 is that from the addendum to just above the pitch line, the cross-section of the tooth is uniform from one flank or end face to the other, while from a few thousandths of an inch above the pitch line to the dedendum, the tooth converges slightly from the equator to each flank face. The convergence is on the order of a few thousandths of an inch, measured on the end face, from the centerline of the tooth, for a gear on the order of four inches in diameter and about 100 teeth, and the convergence is gradual from the equator to the flank face. Although not limited thereby, it has been found that the width or thickness of a gear of the present invention when meshed with a spur gear in an industrial coupling, measured from face 27 to face 28, can be about twenty-five per cent of the pitch diameter of the gear before the rate of convergence of the center lines 38 of teeth 21 becomes too great to be offset by cutting into the pitch-dedendum portion of teeth 21 to leave a tooth of dimensions comparable to that at the equatorial plane. The center lines 38 of teeth 21 converge in accordance with the cosine of the angle X O Y, (Fig. 7) and when this angle is ninety degrees, that is when Y coincides with pole 29, the cosine of the angle is zero and the distance between centerlines 38 is therefore zero, and thus all centerlines converge at the pole 29.

One means of cutting the spherical gear of the present invention is shown in Fig. 2, wherein 39 indicates a cutter having an involute cutting portion 40 including a valley cutting portion 41 and an additional external cutting surface 42 having an involute shape. Gear 20 is mounted in any conventional machine, not shown, having any conventional indexing mechanism, not shown, and is mounted for oscillation in the plane, which passes vertically through the great circle including the poles of the spherical gear 20. Cutter 39 is rotated in the fashion of ordinary gear cutters, and when the blank has been oscillated through cutter 39 once, there is left standing an involute tooth 43, which is of uniform cross-section throughout its length and a valley on each side thereof having uniform width. If this were the only cut made on each tooth, then the resulting gear would have teeth of uniform cross-section with the centerlines thereof converging to the poles, and with the opposite edges of its valleys, gradually converging from the equator to each flank face. The valleys would converge, since, as each adjacent tooth is being cut, the cutting portion 41 encroaches upon a part of the valley already cut, due to the convergence of the centerlines of teeth 21, as indicated in Fig. 6. With the cutting portion 42 present, however, the next cut after the indexing of tooth 43 to the right will not only leave standing a second tooth of uniform cross-section throughout its length, but that portion of the left side of original tooth 43 between pitch line (that is, just above the pitch line) and the addendum will be cut parallel to the centerline of the new tooth being cut, hence converging, from the equator to each flank face, toward the centerline of original tooth 43. This procedure, followed completely around the gear blank, leaves standing teeth 21 of the shape described above. Points 44 in Fig. 6 represent the points of convergence of the edges of the valleys after the first cut; that is, prior to the cutting of a tooth side-wall by cutting surface 42. It will be seen therefore that surface 42 effects a cut that changes considerably the shape of the teeth and valleys of the gear cut by surfaces 40 and 41 only.

The slight divergence of valleys 22 effected by the cutting operations above set forth performs a most important function when the gear 20 is used in a shaft coupling. Fig. 8 shows such a coupling, which includes a housing 45, made in two parts joined by screw and bolt members 46 through flanges 47 and 48. Each half of housing 45 has an integral internal spur gear 49 of conventional form, which is in mesh with a spherical gear 20, of the novel type described above, being connected to shafts 50 and 51 by any conventional means, such as keying. Grease or oil may be introduced into housing 45 through ports 52, normally plugged, as shown. A fluid tight seal of oil or grease within housing 45 is effected by ring members 53, of "Neoprene" or other flexible, yet sturdy, and oil resistant material, tightly encircling sleeve members 54 of gears 20, and having annular flanges 55 fitting within preformed grooves in housing members 45. Restraining rings 57 are tightly pressed against ring members 53 by means of screws 58, engaging with tapped holes 59 in housing members 45. Enlarged hub members 25 integral with gears 20 make possible the use of a long key member and act as buffers to keep gears 20 centered within housing member 45.

Having reference to Fig. 4 there is shown in detail a portion of coupling housing 45 and gear 20 meshing with spur gear 49 in the equatorial plane of gear 20. In this condition the axes of gears 20 and 49 coincide and there is no misalignment of any two rotating machines that might be coupled. Fig. 5 shows in detail the meshing of gears 20 and 49 for the condition of maximum permissible misalignment, which may be about five or six degrees. In this case the axes of gear 20 and gear 49 are out of coincidence by the angle of shaft misalignment. By the novel gear construction of the present invention, there is avoided all backlash and binding that have been heretofore inherent in conventional couplings. These deficiencies in the prior art couplings are overcome by the present invention since the "front" and "back" faces (where the "front" is considered to be that side of each tooth foremost for the direction of rotation selected, and the "back" is that side opposite the "front") of each tooth are always in bearing relation to the teeth of the spur gear 49. Under condition of no misalignment the front and back faces of each tooth of gear 20 are in mesh with the teeth of gear 49 in the same, or equatorial plane, and when misalignment exists, then the front face of each tooth 21 of gear 20 will mesh, in a complete cycle of rotation, at first, in the equatorial plane, then progressively farther and farther to one side, for example the right, of the equatorial plane until 90 degrees, or one quarter cycle has been completed. At this point the front face of any tooth 21 of gear 20 begins to mesh with teeth of spur gear 49 progressively more and more toward the equator, until, when one half cycle of rotation, or 180 degrees, has been completed, teeth 21 of gear 20 are again meshing in the equatorial plane with the teeth of gear 49. During the next 180 degrees of rotation the meshing point moves outwardly from the equator till 90 degrees, then progressively back to the equator, and at the end of one cycle, or 360 degrees of rotation, the teeth 21 are again meshing with teeth of gear 49 on the equator of the spherical gear 20.

At the beginning of this cycle above described, the back side of any tooth 21 was meshing on the equator, and as point of contact or mesh of the front side moved to the right, the point of mesh of the back side moved to the left, repeating on the left side for 180 degrees, then on the right side for the second 180 degrees, the meshing of the front side. As each of the teeth 21 undergoes this same cycle, it is apparent that the front and back sides of all of teeth 21 are constantly in mesh with adjacent teeth of gear 49. Therefore, at no time is there any backlash or play between teeth. Due to the rate at which valleys 22 diverse, there is at no time any binding of teeth. As the point of meshing between teeth progresses from the equator outwardly then inwardly, there is no sliding motion between teeth, but a continuous rocking which smoothly transfers the point of meshing in accordance with the degree of misalignment between coupled shafts. If the coupled shafts 50 and 51 in Fig. 8 are misaligned by the maximum amount accommodated by the coupling, then the teeth 21 of gear 20 mesh from the equator and progressively out to the flank faces 27 and 28 and back, but if the misalignment is less than the maximum, then the meshing will be confined to the equatorial plane and only a portion of teeth 21 on each side of the equatorial plane. This holds true whether the misalignment be the so-called "parallel" ("offset"), "angular," or a combination of both.

The addendum portion of the teeth 21 of gear 20 do not bind in the dedendum or root portions of spur gear, although both gears have the same pitch diameter and circular pitch. This is true since the normal clearance provided in meshing teeth is provided in the instant case. Although the scale of the drawings does not permit a showing, it is customary that the radial distance between the addendum and pitch circles is slightly less than the distance between the pitch and the dedendum or root circles. Since this feature is well-known in the gear making art, it will not be further discussed here.

A novel machine for cutting the spherical gear of the present invention is shown in Figs. 9, 10, 11, and 12. The conventional tool supporting and driving portion of a milling machine are shown at 60, with an involute cutter 61 thereon, driven through arbor 62 by any desired source, not shown. The usual base or saddle portion 63 of the machine has upright brackets 64 and 65 solidly connected thereto by means of nuts and bolts 66. Pivotally supported at 67 and 68 by brackets 64 and 65 is a carriage member 69 having rocker arms 70 and 71, a bridge portion 72, and depending gear segments 73 and 74, which mesh with toothed racks 75 and 76 respectively, carried by a bed plate 77, securely fastened to table portion 78, by the screws and bolts 79, and which in turn is slidably retained upon saddle portion 63 by the conventional dovetail connection 80. For the purposes of clarity, the standard controls for raising the work to be cut and for advancing and withdrawing table 78 in making a cut, are not shown, since their operation is well understood by those skilled in machine shop practices.

Carriage member 69 has cast integrally therewith a headstock 81 and a tailstock 82, between which are suspended a mandrel or arbor 83 carrying the work or gear blank 20 keyed thereto, a shaft 84 joined to mandrel 83 by any suitable coupling means 85, to be described later, and a shim or spacing member 86, bearing against face of gear blank 20 and tightly pressing the blank onto mandrel 83 by means of a nut 87 screw-threaded to mandrel 83. Shaft 84 is driven, and in turn drives mandrel 83 and gear blank 20 by means of a worm and wheel 88 of a conventional indexing mechanism, not shown.

Pivotal points 67 and 68 have their rocker axes in line with the center of the sphere from which gear 20 is formed, and thus the rocking of carriage member 69 oscillates gear blank 20, through the same arc that would result from oscillating gear 20 about point 0 in Fig. 7, in the great circle including poles 29 and 30 and the vertical plane passing through these points. This oscillation is effected in the machine shown by mere advancement of bed-plate 77 to feed gear 20 to the cutting tool 61. When bed-plate 77 is advanced, racks 75 and 76 compel the gear segments 73 and 74 to rock or oscillate about pivot points 67 and 68. Obviously, when bed-plate is retracted upon completion of a cut, gear blank 20 is oscillated in the opposite direction.

If no other motion were imparted to gear blank 20, the finished gear would have involute teeth of convex shape from the equatorial section to each flank face, and the valleys between the teeth would be of uniform width from one end or flank face to the other. An additional motion, however, is imparted to gear blank 20, in order that the finished gear may conform to the type described in the consideration of Figs. 2, 6, and 7.

Having particular reference to Figs. 10 and 11, there is shown at 89 a split sleeve, surrounding the cylindrical portion 90 of mandrel 83. Split bushing 89 may be of any durable bearing material such as bronze or brass, and it in turn is embraced by a split housing 91 having upstanding, opposed flanged members 92, through which passes a shaft 93, having an integral handle member 94. One of flange members 92, for example that shown in elevation in Fig. 11, is smooth-bored so that shaft 93 passes through without frictional engagement, while the other, for example that shown in Fig. 10, has a screw threaded bore to engage with threads on the end of shaft 93. With handle 94 in the position shown, housing 91 tightly compresses sleeve member 89 and thus grips cylindrical portion 90 of mandrel 83 in a tight frictional lock, so that relative motion between mandrel 83 and housing 91 can not occur, but when handle 94 is raised counter-clockwise into a vertical position, the relative motion is easily obtained.

Housing 91 has an arm member 95 extending through an aperture 96 in bridge 72. Having particular reference to Figs. 9, 11, and 12, it will be seen that arm 95 terminates in an enlarged end member 97 having screw threaded bores 98 into which screw threaded pin members 99 and 100 may be threaded, having head portions suitably knurled, as indicated in Fig. 11, so that they may be advanced into or withdrawn from screw-threaded bores 98 by hand, or by any standard tool. Pins 99 and 100 are engageable with cam grooves 101 and 102 in cam member 103, which is carried on a shaft 104, having one end journaled in the plate carrying gear segment 74 and the other journaled in the plate carrying gear segment 73, and passing therethrough, terminating in a gear 105. Any suitable means, not shown, may be employed to absorb thrusts on shaft 104, so that cam member 103 is always maintained centered between gear segments 74 and 75.

Gear 105 meshes with an arcuate gear segment, 106, which is fastened to upright bracket 64 by studs 107, or any other suitable means. When bed-plate 77 is advanced, causing gear blank 20 to be oscillated through the engagement of gear segments, 74 and 73, with racks 76 and 75, cam 103 is also rotated through the engagement of gear 105 with arcuate segment 106. If either of pins 99 or 100, (but not both) is engaged in its cam groove or track 101 or 102, arm 95 will be rocked about the center of mandrel 83, forcing gear blank to be oscillated on its axis of rotation and causing cutter 61 to cut gear blank 20 in a curved valley, symmetrical upon each side of the equatorial section.

If there were a rigid, unitary shaft and connection from indexing wheel 88 to arm 95, then, the rocking of mandrel 83 under the control of cam 103 and arm 95 would be impossible without breakage of the indexing mechanism, arm 95, or some other member of the machine. The coupling 85 permits mandrel 83 to be rocked by arm 95 without injury to the indexing mechanism as it comprises a flanged member 107 having male shaft portion 108 projecting into a female bearing portion in hub member 109. A ball 110 is held disengageably seated in a detent 111 in member 107 by spring member 112 recessed into hub member 109. When handle 94 is in the vertical position, releasing the driving connection between arm 95 and mandrel 83, the operator may index the gear blank, and worm and wheel 88 will rotate the mandrel 83 and blank 20 through the shaft 84 and coupling 85. After indexing is completed, handle 94 may then be rotated clockwise to lock arm 95 to mandrel 83, and when mandrel 83 is rocked under the control of cam 103 and arm 95, detent 111 is carried past ball 110, allowing relative rotation between mandrel 83 and shaft 84, thus preventing the breakage of the indexing mechanism or any other portion of the machine.

The developed cam surface shown in Fig. 13 illustrates the motion imparted to gear blank 20 by cam 103. Assuming the points of zero and 360 degrees to represent the position of greatest withdrawal (which is arbitrary) of the bed-plate 77 from cutter 61, X degrees and Y degrees the instants that the flank faces 27 and 28 are being passed through cutter 61, and letting the 180 degree point represent the instant when gear blank 20 is being cut on the equatorial plane, it will be seen that cam 103 has oscillated gear 20 upon its rotative axis by the maximum amount at the beginning and end of each cut; that is, taking the 180 degree position as indicating the instant of zero oscillation on the rotative axis. At any point between zero and Y degrees and between X and 360 degrees, gear blank 20 is indexed for another tooth. Assuming that pin 100 is engaged in cam track 102 and pin 99 is completely retracted from cam track 101, blank 20 will be oscillated first clockwise or to the right (having reference to Fig. 9) from the cutting of one flank face until the equator is reached, then gradually back counter-clockwise or to the left until, as the second flank face is cut, the gear has been returned to the left by the amount that it had been displaced to the right. This motion results in the cutting of a valley having one edge diverging from the equator to each flank face by an amount equalling one-half the total divergence of the completed valley from the center line thereof, and if pin 100 is left engaged as each tooth is indexed, then upon complete rotation of gear blank 20 back to the first tooth cut, each valley will have the character just set forth. If pin 100 is then disengaged from its cam track 102 and pin 99 is engaged in its cam track 101, and the gear indexed completely around after each cut taken, cam track 101 will have caused gear 20 to be oppositely rotated during each cut from the direction of rotation impressed by cam track 102, and the resulting valley will diverge on its opposite side, by a total amount equal to one-half the divergence from the center line thereof, leaving teeth 21 and valleys 22 as shown clearly in Fig. 6.

While gear blank 20 is being indexed, handle 94 is maintained in its vertical position, allowing relative movement between mandrel 83 and arm 95, and after indexing and before the bed-plate 77 is advanced, handle 94 is placed in the position shown in Figs. 10 and 11, gripping cylindrical portion 90 of mandrel 83 and preventing relative movement between mandrel 83 and arm 95.

While the gear cutting machine shown in Figs. 9, 10, and 11 is a fixture to a milling machine, it has been so shown only as an example of one form that the machine may take. Obviously, the machine may take other forms.

The teeth 21 above described have, for the purposes of simplicity, been referred to as involutes. The invention is not restricted to the use of involute teeth, as other forms of teeth may be manufactured that satisfy the essential requirements of the present invention. Further, it is obvious that a hobber may be used for a roughing cut if so desired. End faces 27 and 28 are shown to be parallel and flat, but they may be curved or recessed as desired without exceeding the limits of the invention.

In Fig. 8 the gear coupling of the present invention is shown as comprising two spherical gears 20, and two internal gears 49. If desired, one spherical gear 20 and the internal gear 49 meshing therewith may be eliminated. The resultant coupling will have all the desirable characteristics of that shown, except that it will accommodate only smaller angles of misalignment between shafts 50 and 51 than the misalignment accommodated by the coupling shown in Fig. 8.

Certain of the subject matter herein contained has been taken from the co-pending cases of John W. Barcus, Serial No. 207,374, filed May 11, 1938; Serial No. 222,268, filed July 30, 1938; and Serial No. 294,191, filed September 9, 1939.

While enough of the present invention has been disclosed in the drawings and specification, that will give those skilled in the art a clear understanding thereof, it is to be understood that the invention is not to be limited thereby, but only by the scope of the appended claims.

What is claimed is:

1. A gear coupling for driving and driven shafts comprising a housing, an internal gear carried by said housing, said gear having spur teeth, a spherical gear carried by one of said shafts and meshing with said internal gear, said spherical gear having the same diametral pitch as said internal gear, the teeth on said spherical gear having addendum, pitch and dedendum portions, and valleys therebetween, the surface of said teeth on said addendum portion being of constant width throughout the length of said teeth, the pitch and dedendum portions of said teeth converging slightly from the central plane of said spherical gear to each end face, and said valleys diverging slightly from said central plane to each end face, said pitch portions being at a constant distance from the center of said spherical gear in said central plane throughout the length of said teeth whereby the point of contact of each tooth on said spur gear may rock back and forth on each side of said central plane during conditions of misalignment between said shafts.

2. A coupling for shafts subject to misalignment, including a housing carrying an internal spur gear, a spherical gear within said housing and meshing with said spur gear, involute teeth on said spherical gear having addendum, pitch and dedendum portions, valleys therebetween, said teeth being of constant width on the addendum portion throughout their length, convergent at the pitch and dedendum portions from the central plane of said teeth to their outer edges, said portions being at fixed radial distances from the center of said spherical gear between said faces and said valleys being divergent from said central plane to the outer edges of said gear.

JOHN W. BARCUS.